US012729914B2

(12) United States Patent
Kang et al.

(10) Patent No.: US 12,729,914 B2
(45) Date of Patent: Sep. 8, 2026

(54) FIRING FURNACE

(71) Applicant: SAMSUNG ELECTRO-MECHANICS CO., LTD., Suwon-si (KR)

(72) Inventors: Seung On Kang, Suwon-si (KR); Wan Ho Chung, Suwon-si (KR); Sung Chan Park, Suwon-si (KR); Chun Song Kwon, Suwon-si (KR); Myoung Hoon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 495 days.

(21) Appl. No.: 18/140,839

(22) Filed: Apr. 28, 2023

(65) Prior Publication Data

US 2023/0366626 A1 Nov. 16, 2023

(30) Foreign Application Priority Data

May 10, 2022 (KR) ........................ 10-2022-0057304
Sep. 27, 2022 (KR) ........................ 10-2022-0122722

(51) Int. Cl.
*F27B 9/24* (2006.01)
*F27B 9/02* (2006.01)
(Continued)

(52) U.S. Cl.
CPC ............ *F27B 9/2407* (2013.01); *F27B 9/021* (2013.01); *F27B 9/028* (2013.01); *F27B 9/20* (2013.01);
(Continued)

(58) Field of Classification Search
CPC ........ F27B 9/2407; F27B 9/021; F27B 9/028; F27B 9/20; F27B 9/36; F27B 2009/3638
See application file for complete search history.

(56) References Cited

U.S. PATENT DOCUMENTS

| | | | | |
|---|---|---|---|---|
| 4,192,645 A * | 3/1980 | Hassler | ..................... | F27B 9/10 432/144 |
| 2008/0304941 A1* | 12/2008 | Morita | .................. | F27B 9/2407 414/196 |
| 2024/0167766 A1* | 5/2024 | Stefani | ...................... | F27B 9/20 |

FOREIGN PATENT DOCUMENTS

| | | | | |
|---|---|---|---|---|
| CN | 107917615 A * | 4/2018 | ................ | F27B 9/30 |
| CN | 112985051 A * | 6/2021 | ................ | F27B 9/40 |

(Continued)

OTHER PUBLICATIONS

THT_technical_specification_for_model_rsk2506_conveyor_furnace_2008.pdf (Year: 2008).*

(Continued)

*Primary Examiner* — Michael G Hoang
*Assistant Examiner* — Kurt J Wolford
(74) *Attorney, Agent, or Firm* — MORGAN, LEWIS & BOCKIUS LLP

(57) ABSTRACT

A firing furnace includes a firing furnace main body having an internal passage from an inlet to an outlet, a first heating portion disposed in an upper portion of the internal passage, a second heating portion disposed in a central portion of the internal passage, a third heating portion disposed in a lower portion of the internal passage, a first transporting roller disposed between the first heating portion and the second heating portion, and a second transporting roller disposed between the second heating portion and the third heating portion. A distance between the first heating portion and the second heating portion is greater than a distance between the second heating portion and the third heating portion.

13 Claims, 6 Drawing Sheets

(51) Int. Cl.
*F27B 9/20* (2006.01)
*F27B 9/36* (2006.01)

(52) U.S. Cl.
CPC ........ *F27B 9/36* (2013.01); *F27B 2009/3638* (2013.01)

(56) References Cited

FOREIGN PATENT DOCUMENTS

| | | | | | |
|---|---|---|---|---|---|
| JP | H1137660 | | * | 2/1999 | |
| JP | 2005-156016 | A | | 6/2005 | |
| WO | WO-2019107651 | A1 | * | 6/2019 | ............... F27D 3/10 |
| WO | WO-2020130669 | A1 | * | 6/2020 | ........... F27D 17/302 |

OTHER PUBLICATIONS

CN-107917615-A translation (Year: 2025).*
CN-112985051-A translation (Year: 2025).*
JP_H1137660_A translation (Year: 2025).*
WO-2019107651-A1 translation (Year: 2025).*
WO-2020130669-A1 translation (Year: 2025).*

* cited by examiner

A-A'

B-B'

Z3

FIRING FURNACE

CROSS-REFERENCE TO RELATED APPLICATION(S)

This application claims benefit of priorities to Korean Patent Applications Nos. 10-2022-0057304 filed on May 10, 2022 and 10-2022-0122722 filed on Sep. 27, 2022 in the Korean Intellectual Property Office, the disclosures of which are incorporated herein by reference in its entirety.

TECHNICAL FIELD

The present disclosure relates to a firing furnace.

BACKGROUND

Although various types of firing furnaces used in the sintering process of a multilayer ceramic capacitor (MLCC) exist, a roller hearth kiln (RHK) type firing furnace which is advantageous in terms of productivity is mainly used.

Currently, the RHK firing furnace which is mainly used for the sintering process of the MLCC has a long shape of about 17.5 m. As the manufacturing process of the MLCC changes, unnecessary periods increase, causing a very large loss of electrical energy and gas for operating the firing furnace.

Accordingly, demand for development of a firing furnace capable of maximizing energy efficiency and productivity is required.

SUMMARY

An aspect of the present disclosure may provide a firing furnace with excellent energy efficiency.

Another aspect of the present disclosure may provide a firing furnace capable of maximizing productivity.

However, the objects of the present disclosure are not limited to the above, and will be more easily understood in the process of describing specific embodiments of the present disclosure.

According to an aspect of the present disclosure, a firing furnace includes a firing furnace main body having an internal passage from an inlet to an outlet, a first heating portion disposed in an upper portion of the internal passage, a second heating portion disposed in a central portion of the internal passage, a third heating portion disposed in a lower portion of the internal passage, a first transporting roller disposed between the first heating portion and the second heating portion, and a second transporting roller disposed between the second heating portion and the third heating portion. A distance between the first heating portion and the second heating portion may be greater than a distance between the second heating portion and the third heating portion.

According to an aspect of the present disclosure, a firing furnace includes a firing furnace main body having an internal passage from an inlet to an outlet; a first heating portion disposed in an upper portion of the internal passage; a second heating portion disposed in a central portion of the internal passage; a third heating portion disposed in a lower portion of the internal passage; a first transporting roller disposed between the first heating portion and the second heating portion; and a second transporting roller disposed between the second heating portion and the third heating portion. In the firing furnace main body, a temperature rising zone, a temperature maintaining zone, and a cooling zone are sequentially arranged from the inlet to the outlet. A length of the cooling zone is longer than a length of the temperature rising zone and is shorter than a length of the temperature maintaining zone.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
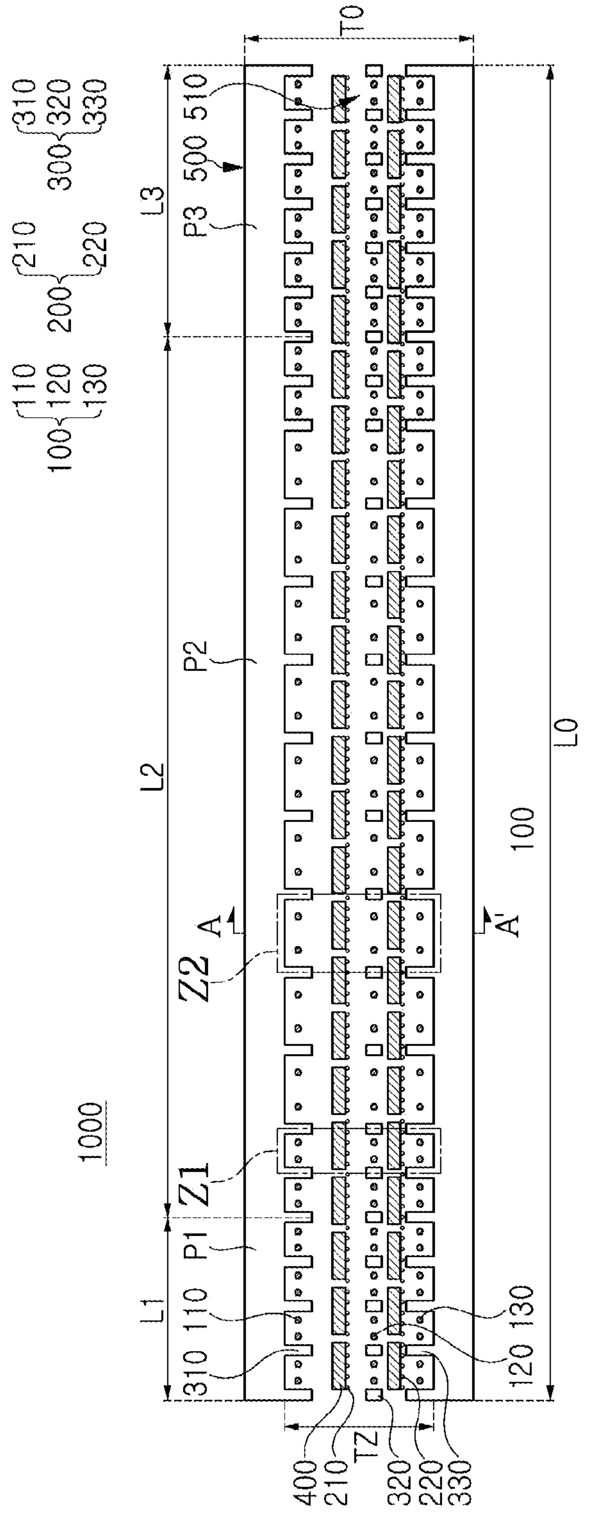
FIG. 1 is a schematic cross-sectional view showing the structure of a firing furnace according to an embodiment of the present disclosure.

Hereinafter, exemplary embodiments will be described with reference to specific embodiments and the accompanying drawings. However, the embodiments of the present disclosure may be modified in many different forms, and the scope of the present disclosure is not limited to the embodiments described below. In addition, the embodiments of the present disclosure are provided to more completely explain the present disclosure to those skilled in the art. Therefore, the shape and size of elements in the drawings may be exaggerated for clearer explanation, and elements indicated by the same reference numerals in the drawings are the same elements.

In addition, to clearly explain the present disclosure in the drawings, parts irrelevant to the description are omitted, and the size and thickness of each component shown in the drawings are arbitrarily shown for convenience of explanation, and thus, the present disclosure is not necessarily limited to what is shown. Also, components having the same function within the scope of the same idea are described using the same reference numerals. Furthermore, throughout the specification, when a portion "includes" a component, it means that the portion does not exclude but may further include other components unless otherwise stated.

Firing Furnace

FIG. 1 is a schematic cross-sectional view showing the structure of a firing furnace according to an embodiment of the present disclosure.

Figure 2:
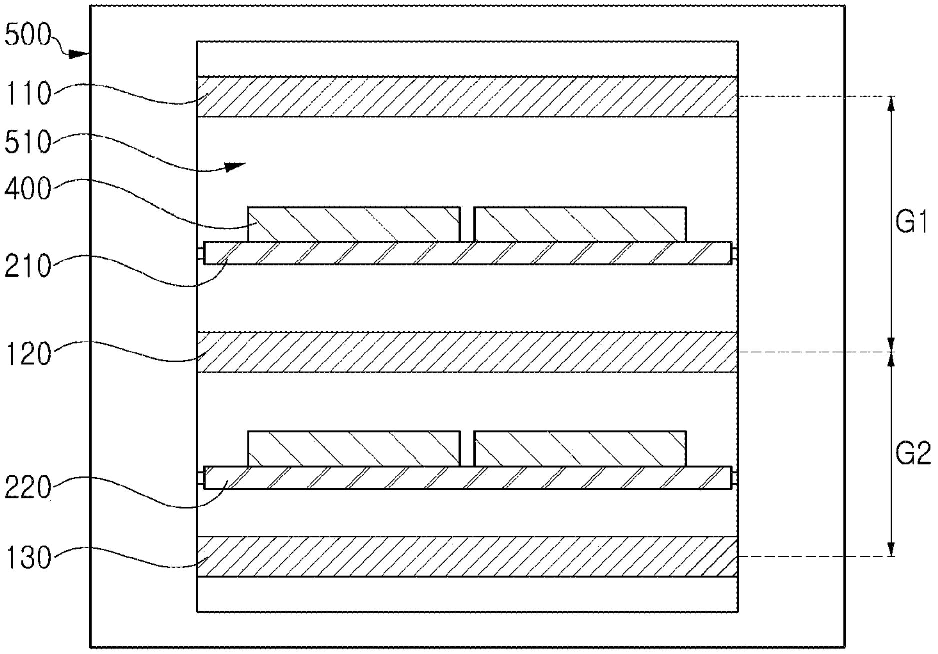
FIG. 2 schematically illustrates a cross-sectional view taken along line A-A' of FIG. 1.

FIG. 2 schematically illustrates a cross-sectional view taken along line A-A' of FIG. 1.

Figure 3:
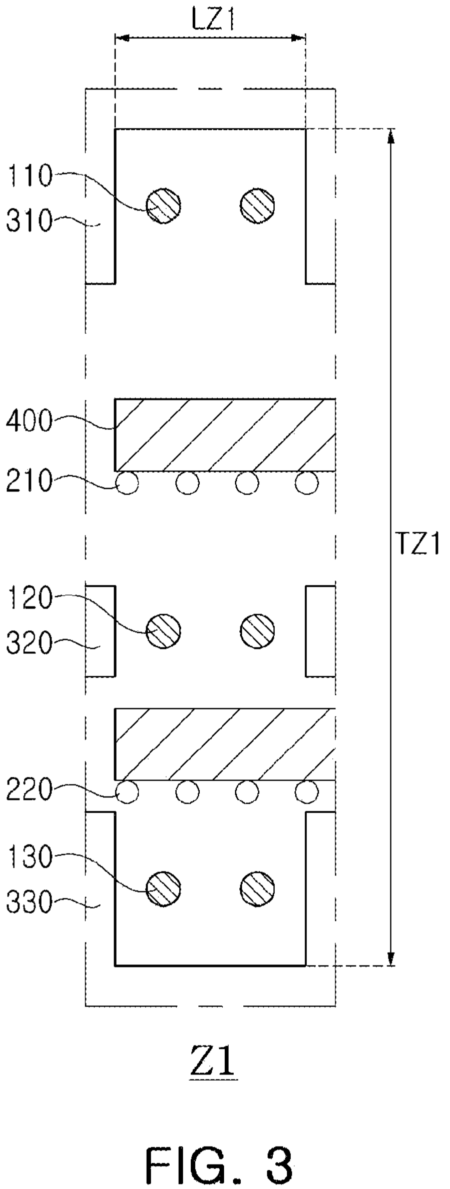
FIG. 3 is an enlarged view of a first region of FIG. 1.

FIG. 3 is an enlarged view of a first region of FIG. 1.

Figure 4:
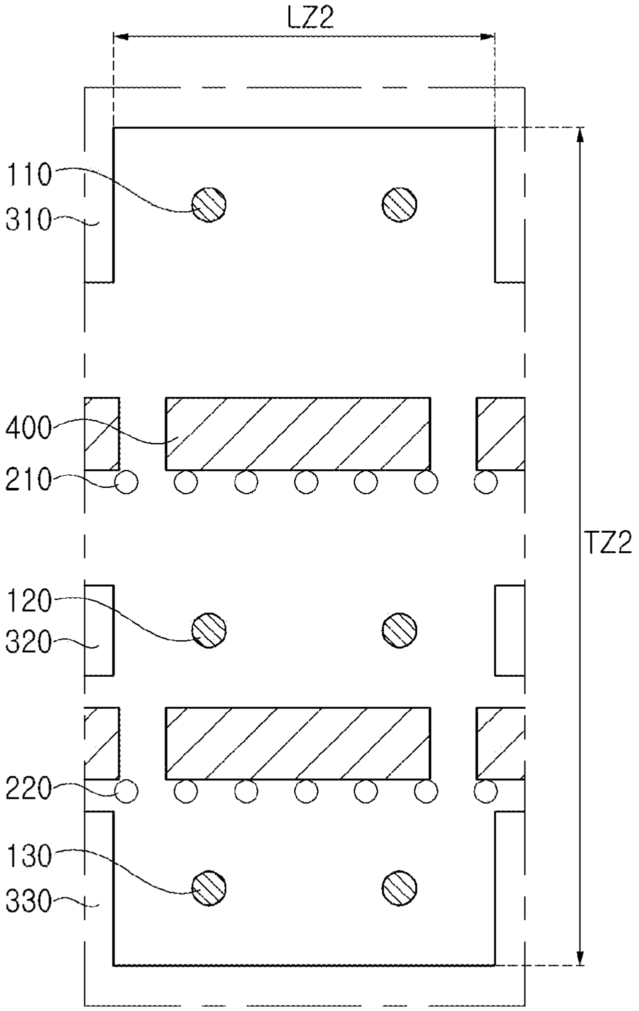
FIG. 4 is an enlarged view of a second region of FIG. 1.

FIG. 4 is an enlarged view of a second region of FIG. 1.

Hereinafter, a firing furnace 1000 according to an embodiment of the present disclosure will be described in detail with reference to FIGS. 1 to 4.

The firing furnace 1000 according to an embodiment of the present disclosure includes a firing furnace main body 500 having an internal passage 510 from an inlet to an outlet; a first heating portion 110 disposed in the upper portion of the internal passage 510; a second heating portion 120 disposed in the central portion of the internal passage 510; a third heating portion 130 disposed in the lower portion of the internal passage 510; a first transporting roller 210 disposed between the first and second heaters 110 and 120; and a second transporting roller 220 disposed between the second and third heaters 120 and 130. A distance G1 between the first heater 110 and the second heater 120 may be greater than a distance G2 between the second heater 120 and the third heater 130.

The transporting rollers 210 and 220 may serve to transport a sintering object, and the sintering object may be included in a tray 400 and transported.

The sintering object is not particularly limited, but, for example, the sintering object is a laminate formed by laminating ceramic green sheets, and may become a body of a multilayer ceramic capacitor (MLCC) after sintering.

Each of the first to third heating portions 110, 120, and 130 may serve to supply a heat source to a sintering object transported by each of the first and second transporting rollers 210 and 220.

In addition, each of the first to third heating portions 110, 120, and 130 may serve to increase, maintain, or cool the temperature of the sintering object by adjusting the amount of heat source of each of the first to third heating portions 110, 120, and 130.

The sintering object placed on the tray 400 may pass through regions having different temperatures or atmospheric conditions inside the firing furnace as the tray 400 is moved toward the outlet side by the first and second transporting rollers 210 and 220, so that the sintering object may undergo a temperature rising step, a maintaining step, and a cooling step.

In addition, the firing furnace main body 500 may include a gas supply portion, and sintering of the sintering object may be performed by an atmosphere gas supplied through the gas supply portion and the heat source supplied by each of the first to third heating portions 110, 120, and 130.

In addition, the firing furnace main body 500 may include a gas discharge portion, and the atmospheric gas supplied through the gas supply portion may be discharged to the outside of the firing furnace main body 500 through the gas discharge portion.

The first to third heating portions 110, 120, and 130 may be in the form of a double-layer including the first heating portion 110 disposed in the upper portion of the internal passage 510, the second heating portion 120 disposed in the central portion of the internal passage 510, and the third heating portion 130 disposed in the lower portion of the internal passage 510, the first transporting roller 210 disposed between the first and second heaters 110 and 120, and the second transporting roller 220 disposed between the second and third heaters 120 and 130.

Accordingly, the firing furnace may improve productivity by more than two times compared to a single-layer firing furnace.

The air heated by the heat source moves to the upper portion of the internal passage 510, and the lower portion of the internal passage 510 conducts heat through the bottom so that the heat may escape to the outside, and thus, higher heat needs to be applied to the relatively cold lower portion of the internal passage 510.

According to an embodiment of the present disclosure, the distance G1 between the first heater 110 and the second heater 120 is greater than the distance G2 between the second heater 120 and the third heater 130, so that the temperature deviation between the sintering object moving through the first transporting roller 210 and the sintering object moving through the second transporting roller 220 is reduced, and thus, sintering may be uniformly performed.

In an embodiment, the distance G1 between the first heater 110 and the second heater 120 may be greater than or equal to 1.2 times and less than or equal to 1.3 times the distance G2 between the second heater 120 and the third heater 130.

When the distance G1 between the first heater 110 and the second heater 120 is less than 1.2 times or greater than 1.3 times the distance G2 between the second heater 120 and the third heater 130, there is a possibility that the temperature deviation between the sintering object moving through the first transporting roller 210 and the sintering object moving through the second transporting roller 220 may increase.

For example, the distance G1 between the first heater 110 and the second heater 120 may be 220 mm to 260 mm, and the distance G2 between the second heater 120 and the third heater 130 may be 170 mm to 210 mm, but the present disclosure is not limited thereto.

In an embodiment, a heat insulating wall may not be disposed between the first transporting roller 210 and the second transporting roller 220.

When a heat insulating wall is disposed between the first transporting roller 210 and the second transporting roller 220, because heat transfer to the upper and lower portion of the internal passage 510 is restricted, there is a possibility that the temperature deviation between the sintering object moving through the first transporting roller 210 and the sintering object moving through the second transporting roller 220 may increase.

Currently, a roller hearth kiln (RHK) firing furnace which is mainly used for the sintering process of the MLCC has a long shape of about 17.5 m. As the manufacturing process of the MLCC changes, unnecessary periods increase, causing a very large loss of electric energy and gas for operating the firing furnace.

Accordingly, in the present disclosure, the loss of electric energy and gas may be suppressed by removing unnecessary periods and shortening a length L0 of the firing furnace main body 500.

For example, the length L0 of the firing furnace main body 500 may be 7.0 m to 10.0 m, but is not limited thereto.

When the length L0 of the firing furnace main body 500 is less than 7.0 m or greater than 10.0 m, it may be difficult to perform the sintering process of the sintering object.

In an embodiment, in the firing furnace main body 500, a temperature rising zone P1, a maintaining zone P2, and a cooling zone P3 may be sequentially arranged from the inlet to the outlet, and a length L3 of the cooling zone P3 may be longer than a length L1 of the temperature rising zone P1, and a length L2 of the maintaining zone P2 may be longer than the length L3 of the cooling zone P3.

That is, L2>L3>L1 may be satisfied, and the sintering process may be performed with a minimum length.

In an embodiment, the length L1 of the temperature rising zone P1 may be 1.0 m to 1.5 m, the length L2 of the maintaining zone P2 may be 4.5 m to 6.5 m, and the length L3 of the cooling zone P3 may be 1.5 m to 2.0 m.

The sintering temperature may vary depending on products, but in general, sintering of the MLCC may be performed at 1200° C. or higher.

When L1 is less than 1.0 m, it may be difficult to raise the temperature of the sintering object from room temperature to the sintering temperature, and when L1 exceeds 1.5 m, the length L0 of the firing furnace main body 500 may be longer than necessary.

When L2 is less than 4.5 m, the time for sintering the MLCC may be insufficient, and when L2 is greater than 6.5 m, the length L0 of the firing furnace main body 500 may be longer than necessary.

When L3 is less than 1.5 m, it may be difficult to cool the temperature of the sintering object from the sintering temperature to room temperature, and when L3 is greater than 2.0 m, the length L0 of the firing furnace main body 500 may be longer than necessary.

In an embodiment, the length L2 of the maintaining zone P2 may be greater than or equal to 3 times and less than or equal to 6.5 times the length L1 of the temperature rising zone P1, and the length L3 of the cooling zone P3 may be greater than or equal to 1 time and less than or equal to 2 times the length L1 of the temperature rising zone P1.

That is, L1:L2 may be 1:(3 to 6.5), and L1:L3 may be 1:(1 to 2).

Accordingly, the sintering process may be smoothly performed while minimizing the length L0 of the firing furnace main body 500.

For more specific example, L1:L2:L3 may be 1:4.5:1.5.

In an embodiment, the firing furnace main body 500 includes a plurality of regions Z1 and Z2 divided by partition walls 300, and the average length of regions included in the maintaining zone P2 may be longer than the average length of regions included in the temperature rising zone P1 and the cooling zone P3.

Accordingly, the lengths L1 and L3 of the temperature rising zone P1 and the cooling zone P3 may be shortened, and thus, the length L0 of the firing furnace main body 500 may be minimized.

In addition, because the amount of change in internal temperature of each of the temperature rising zone P1 and the cooling zone and P3 is greater than that of the maintaining zone P2, the average length of the regions included in each of the temperature rising zone P1 and the cooling zone and P3 may be reduced, and thus, rapid temperature rising and rapid cooling may be possible while temperature rising speed and cooling speed may be easily controlled.

The partition wall 300 may serve to differently control the internal temperature and atmospheric condition of each region of the internal passage 510 by controlling heat exchange or flow of atmospheric gas in each region.

The partition wall 300 may serve as a separator to prevent air from the internal passage of a previous step from being transferred to the internal passage of a step after a sintering product is transferred when the sintering object is transferred to a step of different internal temperature or atmospheric conditions.

The partition wall 300 is not particularly limited as long as it may control heat exchange or flow of atmospheric gas in each region, and may be made of, for example, copper.

The partition wall 300 may include an upper partition wall 310 disposed on the upper portion of the internal passage 510, a central partition wall 320 disposed on the central portion of the internal passage 510, and a lower partition wall 330 disposed on the lower portion of the internal passage 510.

The upper partition 310, the central partition 320, and the lower partition 330 may be arranged to be spaced apart from each other by certain distances.

As the tray 400 is moved by the first transporting roller 210 to a space between the upper partition wall 310 and the central partition wall 320, the sintering object placed on the tray 400 may be transferred, and as the tray 400 is moved by the second transporting roller 220 to a space between the central partition wall 320 and the lower partition wall 330, the sintering object placed on the tray 400 may be transferred.

In an embodiment, the plurality of regions Z1 and Z2 may include a first region Z1 and a second region Z2 longer than the first region Z1, each of the temperature rising zone P1 and the cooling zone P3 may include a plurality of first regions Z1, and the maintaining zone P2 may include the first and second regions Z1 and Z2, whereas the first region Z1 may be disposed in a region adjacent to the temperature rising zone P1 and the cooling zone P3.

The first region Z1 is disposed in the region adjacent to the temperature rising zone P1 and the cooling zone P3 in the maintaining period p2, thereby suppressing a rapid change in the temperature in initial and last sections of the maintaining zone P2.

In an embodiment, a length LZ2 of the second region Z2 may be greater than or equal to 1.8 times and less than or equal to 2.2 times a length LZ1 of the first region Z1.

Accordingly, the first region Z1 may easily perform a temperature control function, and reduce electric energy consumed in the second region Z2, thereby minimizing the length L0 of the firing furnace main body 500.

For example, the length LZ1 of the first region Z1 may be 200 mm to 250 mm, and the length LZ2 of the second region Z2 may be 420 mm to 480 mm, but the present disclosure is not limited thereto.

In an embodiment, the maintaining zone P2 may include two or more first regions Z1 each having a length of 200 nm to 250 nm in a region adjacent to the temperature rising zone P1, and two or more first regions Z1 in a region adjacent to the cooling zone P3.

Accordingly, it is possible to more easily suppress a rapid change in the temperature in the initial section and the last section of the maintaining zone P2.

In an embodiment, the number of first regions Z1 included in the maintaining zone P2 may be less than or equal to 0.5 time the number of second regions Z2.

Accordingly, it is possible to suppress a rapid change in the temperature in the initial section and the last section of the maintaining zone P2 while sintering of the sintering object is sufficiently performed in the maintaining zone P2.

In an embodiment, the temperature rising speed of the temperature rising zone P1 may be greater than or equal to 9° C./min, the temperature distribution of the maintaining zone P2 may be less than or equal to 2° C., and the cooling speed of the cooling zone P3 may be greater than or equal to 4° C./min.

Accordingly, sintering of the sintering object may be sufficiently performed while the length L0 of the firing furnace main body 500 may be minimized.

In an embodiment, the temperature of the maintaining zone P2 may be higher than or equal to 1200° C.

This is because the sintering temperature may vary depending on products, but sintering of MLCC may be generally performed at a temperature higher than or equal to 1200° C.

Embodiment

Figure 5:
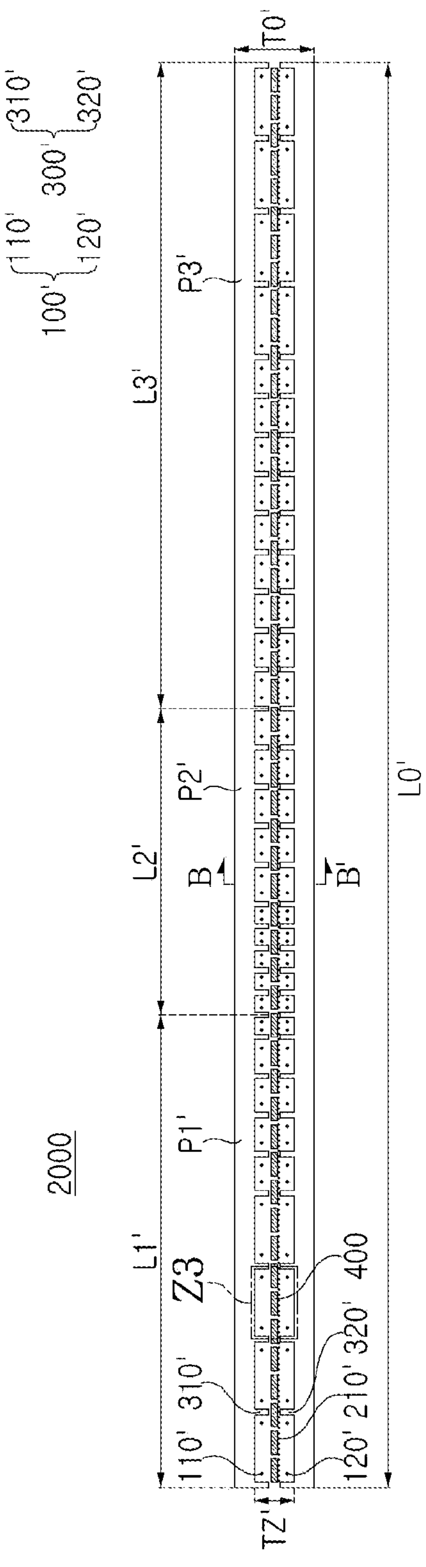
FIG. 5 is a schematic cross-sectional view showing the structure of a firing furnace of the related art.

FIG. 5 is a schematic cross-sectional view showing the structure of a firing furnace of the related art.

Figure 6:
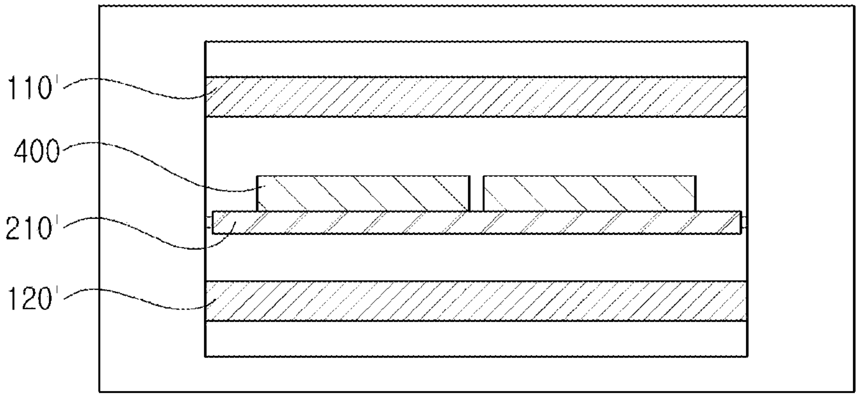
FIG. 6 schematically illustrates a cross-sectional view taken along line B-B' of FIG. 5.

FIG. 6 schematically illustrates a cross-sectional view taken along line B-B' of FIG. 5.

Figure 7:
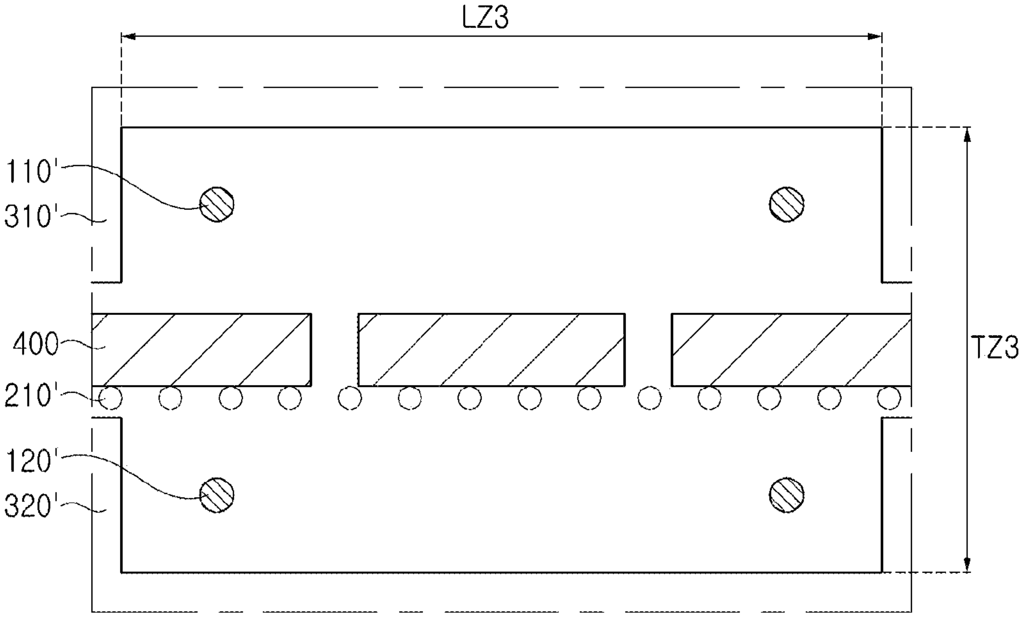
FIG. 7 is an enlarged view of a third region of FIG. 5.

FIG. 7 is an enlarged view of a third region of FIG. 5.

A comparative example is a RHK firing furnace of the related art, and a firing furnace main body has a very long length L0' of 17.5 m.

This is because a temperature rising zone P1' has a very long length L1' of 5.5 m for the binder removal to remove a binder included in a sintering object, and a cooling zone P3' also has a very long length L3' of 7.5 m for reoxidation after sintering of the sintering object.

A length L2' of a maintaining zone P2' is 4.5 m.

In addition, the very long third zone Z3 is included in each of the temperature rising zone P1' and the cooling zone P3' for the binder removal and reoxidation.

The length LZ3 of the third region Z3 is very long about 4 times the length LZ1 of the first region Z1.

In addition, only one transporting roller 210' is disposed in an internal passage, each of heights TZ' and TZ3 of regions is 500 mm, and a height T0' of the firing furnace main body is 940 mm.

The invention embodiment is a firing furnace having the structure shown in FIGS. 1 to 4, the length L0 of the firing furnace main body is 8.45 m, the length L1 of the temperature rising zone P1 is 1.5 m, the length L2 of the maintaining zone P2 is 4.95 m, the length L3 of the cooling zone P3 is 2.0 m, each of heights TZ, TZ1, and TZ2 of the regions is 620 mm, and a height T0 of the firing furnace main body is 1.08 m.

In addition, the distance G1 between the first heater and the second heater is 240 mm, the distance G2 between the second heater and the third heater is 190 mm, the length LZ1 of the first region is 225 mm, and the length LZ2 of the second region is 450 mm.

The sintering process of MLCC is performed using the firing furnaces of the comparative example and the invention embodiment and then, energy consumption therebetween is compared and shown in Table 1 below.

TABLE 1

| | Comparative example | Invention embodiment |
|---|---|---|
| Power consumption | 185 kW | 130 kW |
| Energy consumption rate | 100% | 70% |
| Production | 1.0 | 2.0 |
| Energy consumption per unit production | 100% | 35% |

When the production of the comparative example is 1.0, the invention embodiment has a double-layer structure and achieves twice the production, the energy consumption rate of the invention embodiment is 70% when the energy consumption rate of the comparative example is 100%.

It may be confirmed that the energy consumption per unit production is a value obtained by dividing the energy consumption rate by the production and is 35% of the comparative example so that the energy efficiency is significantly different.

In addition, it may be confirmed that in the invention embodiment, when the temperature rising speed in the temperature rising zone is 9.2° C./min, and the temperature in the maintaining zone is 1220° C., and the cooling speed in the cooling zone is 4.2° C./min, the temperature deviation in the maintaining zone is maintained within 2° C.

Therefore, according to the present disclosure, energy efficiency and productivity may be maximized as well as the sintering process may also be smoothly performed.

As set forth above, according to an embodiment in the present disclosure, energy efficiency and productivity may be maximized by shortening the length of the firing furnace of the related art and changing a single-layer transporting roller into a double-layer transporting roller.

However, various advantages and effects of the present disclosure are not limited to the description above, and will be more readily understood in the process of describing specific embodiments of the present disclosure.

Although the embodiments of the present disclosure have been described in detail above, the present disclosure is not limited by the above-described embodiments and the accompanying drawings, and is intended to be limited by the appended claims.

Therefore, various forms of substitution, modification, and change will be possible by those skilled in the art within the scope of the technical spirit of the present disclosure described in the claims, which also falls within the scope of the present disclosure.

What is claimed is:

1. A firing furnace comprising:

a firing furnace main body having an internal passage from an inlet to an outlet;

a first heating portion disposed in an upper portion of the internal passage;

a second heating portion disposed in a central portion of the internal passage;

a third heating portion disposed in a lower portion of the internal passage;

a first transporting roller disposed between the first heating portion and the second heating portion; and a second transporting roller disposed between the second heating portion and the third heating portion, wherein a distance between the first heating portion and the second heating portion is greater than or equal to 1.2 times and less than or equal to 1.3 times a distance between the second heating portion and the third heating portion, and wherein in the firing furnace main body, a temperature rising zone, a temperature maintaining zone, and a cooling zone are sequentially arranged from the inlet to the outlet, a length of the cooling zone is longer than a length of the temperature rising zone, and a length of the temperature maintaining zone is longer than the length of the cooling zone, wherein the firing furnace main body includes a plurality of regions divided by partition walls, and wherein an average length of the regions included in the temperature maintaining zone is longer than an average length of the regions included in each of the temperature rising zone and the cooling zone, wherein the plurality of regions include a first region and a second region longer than the first region, wherein each of the temperature rising zone and the cooling zone includes a plurality of the first regions, and wherein the temperature maintaining zone includes the first region and the second region, the first region being disposed in a region adjacent to the temperature rising zone and the cooling zone.

2. The firing furnace of claim 1, wherein the distance between the first heating portion and the second heating portion is 220 mm to 260 mm, and the distance between the second heating portion and the third heating portion is 170 mm to 210 mm.

3. The firing furnace of claim 1, wherein a heat insulating wall is not disposed between the first transporting roller and the second transporting roller.

4. The firing furnace of claim 1, wherein a length of the firing furnace main body is 7.0 m to 10.0 m.

5. The firing furnace of claim 1, wherein the length of the temperature rising zone is 1.0 m to 1.5 m, the length of the temperature maintaining zone is 4.5 m to 6.5 m, and the length of the cooling zone is 1.5 m to 2.0 m.

6. The firing furnace of claim 1, wherein the length of the temperature maintaining zone is greater than or equal to 3 times and less than or equal to 6.5 times the length of the temperature rising zone, and the length of the cooling zone is greater than or equal to 1 time and less than or equal to 2 times the length of the temperature rising zone.

7. The firing furnace of claim 1, wherein a length of the second region is greater than or equal to 1.8 times and less than or equal to 2.2 times a length of the first region.

8. The firing furnace of claim 1, wherein a length of the first region is 200 mm to 250 mm, and a length of the second region is 420 mm to 480 mm.

9. The firing furnace of claim 1, wherein the temperature maintaining zone includes two or more first regions each having a length of 200 nm to 250 nm in a region adjacent to the temperature rising zone and two or more first regions in a region adjacent to the cooling zone.

10. The firing furnace of claim 1, wherein a number of first regions included in the temperature maintaining zone is less than or equal to 0.5 times a number of second regions included in the temperature maintaining zone.

11. The firing furnace of claim 1, wherein a temperature rising speed of the temperature rising zone is greater than or equal to 9° C./min, a temperature deviation of the temperature maintaining zone is less than or equal to 2° C., and a cooling speed of the cooling zone is greater than or equal to 4° C./min.

12. The firing furnace of claim 11, wherein a temperature of the temperature maintaining zone is higher than or equal to 1200° C.

13. A firing furnace comprising:

a firing furnace main body having an internal passage from an inlet to an outlet;

a first heating portion disposed in an upper portion of the internal passage;

a second heating portion disposed in a central portion of the internal passage;

a third heating portion disposed in a lower portion of the internal passage;

a first transporting roller disposed between the first heating portion and the second heating portion; and a second transporting roller disposed between the second heating portion and the third heating portion, wherein a distance between the first heating portion and the second heating portion is greater than a distance between the second heating portion and the third heating portion, wherein in the firing furnace main body, a temperature rising zone, a temperature maintaining zone, and a cooling zone are sequentially arranged from the inlet to the outlet, a length of the cooling zone is longer than a length of the temperature rising zone, and a length of the temperature maintaining zone is longer than the length of the cooling zone, wherein the firing furnace main body includes a plurality of regions divided by partition walls, and an average length of the regions included in the temperature maintaining zone is longer than an average length of the regions included in each of the temperature rising zone and the cooling zone, wherein the plurality of regions include a first region and a second region longer than the first region, each of the temperature rising zone and the cooling zone includes a plurality of the first regions, and the temperature maintaining zone includes the first region and the second region, wherein the first region is disposed in a region adjacent to the temperature rising zone and the cooling zone.

* * * * *